United States Patent
de Almeida Forjaz de Lacerda et al.

(10) Patent No.: US 11,210,301 B2
(45) Date of Patent: Dec. 28, 2021

(54) CLIENT-SIDE SEARCH RESULT RE-RANKING

(71) Applicant: Apple Inc., Cupertino, CA (US)

(72) Inventors: João Pedro de Almeida Forjaz de Lacerda, Santa Cruz, CA (US);
Karolina Buchner, San Jose, CA (US);
Vivek Sehgal, Santa Clara, CA (US);
Hon Yuk Chan, Santa Clara, CA (US);
Vipul Ved Prakash, San Francisco, CA (US); Lun Cui, Fremont, CA (US)

(73) Assignee: Apple Inc., Cupertino, CA (US)

( * ) Notice: Subject to any disclaimer, the term of this patent is extended or adjusted under 35 U.S.C. 154(b) by 247 days.

(21) Appl. No.: 15/356,189

(22) Filed: Nov. 18, 2016

(65) Prior Publication Data

US 2017/0357650 A1    Dec. 14, 2017

Related U.S. Application Data

(60) Provisional application No. 62/348,702, filed on Jun. 10, 2016.

(51) Int. Cl.
*G06F 16/00* (2019.01)
*G06F 16/2457* (2019.01)
(Continued)

(52) U.S. Cl.
CPC ........ *G06F 16/24578* (2019.01); *G06F 16/95* (2019.01); *G06F 16/951* (2019.01); *G06F 16/9566* (2019.01)

(58) Field of Classification Search
CPC ........... G06F 17/3053; G06F 17/30861; G06F 17/30887; G06F 17/30864; G06F 16/95;
(Continued)

(56) References Cited

U.S. PATENT DOCUMENTS 5,943,670 A * 8/1999 Prager .................... G06F 16/35
6,598,054 B2 * 7/2003 Schuetze .............. G06F 16/358
(Continued)

FOREIGN PATENT DOCUMENTS

WO    WO 2015/170151 A1    11/2015

OTHER PUBLICATIONS

PCT International Search Report and Written Opinion for International Application No. PCT/US2017/036435, dated Jul. 12, 2017, 14 pages.
(Continued)

*Primary Examiner* — Shiow-Jy Fan
(74) *Attorney, Agent, or Firm* — Womble Bond Dickinson (US) LLP

(57) ABSTRACT

A method and apparatus of a device that re-rank a plurality of search results received from a search server on the device is described. In an exemplary embodiment, the device receives, with a browser of the device, a search query from a user. The device further sends the search query to a search server. In addition, the device receives the plurality of search results from the search server, wherein the plurality of search results is ranked according to a first ranking. The device also retrieves browser history of the user, wherein the browser history is collected on the device without revealing the browser history to the search server. The device further re-ranks the plurality of search results according to a second ranking based on at least the browser history. In addition, the device presents the plurality of search results using the second ranking.

17 Claims, 12 Drawing Sheets

(51) Int. Cl.
*G06F 16/951* (2019.01)
*G06F 16/955* (2019.01)
*G06F 16/95* (2019.01)

(58) Field of Classification Search
CPC .............. G06F 16/9566; G06F 16/951; G06F 16/24578
USPC ........ 707/706, 721, 722, 727, 731, 748, 771
See application file for complete search history.

(56) References Cited

U.S. PATENT DOCUMENTS

| | | | | |
|---|---|---|---|---|
| 7,827,170 | B1* | 11/2010 | Horling | G06F 17/30867 707/722 |
| 8,150,830 | B2 | 4/2012 | Badros et al. | |
| 8,645,390 | B1 | 2/2014 | Oztekin et al. | |
| 8,972,391 | B1 | 3/2015 | McDonnell et al. | |
| 9,542,453 | B1* | 1/2017 | Brukman | G06F 16/93 |
| 2005/0210008 | A1* | 9/2005 | Tran | G06F 16/951 |
| 2006/0259480 | A1* | 11/2006 | Zhang | G06F 16/9535 |
| 2007/0005587 | A1* | 1/2007 | Johnson | G06F 16/9535 |
| 2007/0118521 | A1* | 5/2007 | Jatowt | G06F 16/951 |
| 2007/0143260 | A1 | 6/2007 | Markov et al. | |
| 2008/0021860 | A1* | 1/2008 | Wiegering | G06F 16/951 |
| 2010/0205541 | A1* | 8/2010 | Rapaport | G06Q 10/10 715/753 |
| 2010/0268710 | A1* | 10/2010 | Strehl | G06F 17/30648 707/732 |
| 2011/0022598 | A1* | 1/2011 | Pennacchiotti | G06F 16/951 707/739 |
| 2011/0208730 | A1* | 8/2011 | Jiang | G06F 16/951 707/727 |
| 2011/0258174 | A1* | 10/2011 | Badros | G06F 17/30867 707/706 |
| 2012/0072428 | A1* | 3/2012 | Kao | G06F 17/3089 707/748 |
| 2013/0046768 | A1* | 2/2013 | He | G06F 17/30958 707/748 |
| 2013/0103681 | A1* | 4/2013 | Renders | G06F 17/30 707/728 |
| 2013/0262479 | A1* | 10/2013 | Liang | G06F 17/3053 707/748 |
| 2014/0025660 | A1* | 1/2014 | Mohammed | G06F 17/30554 707/722 |
| 2014/0095495 | A1* | 4/2014 | Brukman | G06F 16/24578 707/732 |
| 2014/0280094 | A1* | 9/2014 | Brandstetter | G06F 17/30867 707/723 |
| 2014/0309868 | A1* | 10/2014 | Ricci | G06K 9/00355 701/36 |
| 2016/0055252 | A1* | 2/2016 | Makeev | G06F 17/3053 707/733 |

OTHER PUBLICATIONS

Fredrikson, Matthew, et al., "RePriv: Re-imaging Content Personalization and in-browser Privacy" 2011 IEEE Symposium on Security and Privacy, May 22, 2011, pp. 131-146.
Shen, Xuehua, et al., "Privacy Protection in Personalized Search" ACM SIGIR Forum, vol. 41, No. 1, Jun. 2007, pp. 4-17.

* cited by examiner

CLIENT-SIDE SEARCH RESULT RE-RANKING

RELATED APPLICATIONS

Applicant claims the benefit of priority of prior, co-pending provisional application Ser. No. 62/348,702, filed Jun. 10, 2016, the entirety of which is incorporated by reference.

FIELD OF INVENTION

This invention relates generally to search technology and more particularly to re-ranking search results on a client.

BACKGROUND OF THE INVENTION

A user will often perform a query search to lookup information on the Web or from some other data sources. A query search begins with a client receiving the query string, which is sent to a search server. The search server receives query string and searches a search index for results that match this query string. The search server then returns the results to the client. Each of the results will include a ranking score that is used to rank and present the search results. The search results with a higher ranking are presented higher than results with a lower ranking.

After the client receives and presents the results, the user may engage with some of the results (e.g., click on a link for one of the results and spend time interacting with the website referenced by that link) and may also abandon some of these results. These engagement results can give an indication of the types of search results a user prefers or does not prefer. Because the engagement results can give this indication, it would be helpful if the engagement results, as well as a browser history, can be used to influence the ranking of the search results. Sending these engagement results to a server, however, may needlessly reveal a user's privacy.

SUMMARY OF THE DESCRIPTION

A method and apparatus of a device that re-ranks a plurality of search results received from a search server on the device is described. In an exemplary embodiment, the device receives, with a browser of the device, a search query from a user. The device further sends the search query to a search server. In addition, the device receives the plurality of search results from the search server, wherein the plurality of search results is ranked according to a first ranking. The device also retrieves browser history of the user, where the browser history is collected on the device without revealing the browser history to the search server. The device further re-ranks the plurality of search results according to a second ranking based on at least the browser history. In addition, the device presents the plurality of search results using the second ranking.

In one embodiment, a machine-readable medium having executable instructions to cause one or more processing units to perform a method to re-rank a plurality of search results is described. In this embodiment, the method receives, by a browser of a device, a search query from a user. The method further sends the search query to a search server. The method additionally receives the plurality of search results from the search server, wherein the plurality of search results is ranked according to a first ranking. In addition, the method retrieves a browser history of the user, wherein the browser history is collected on the device without revealing the browser history to the search server. Furthermore, the method re-ranks the plurality of search results, by the device, according to a second ranking based on at least the browser history. The method additionally presents the plurality of search results using the second ranking.

In another embodiment, the method receives a topic model that includes a cluster of terms appearing is a plurality of seed documents. The topic model is a mapping of a plurality of Uniform Resource Locators to topics. The method further generates an interest model from at least the browser history and the topic model. The method re-ranks the plurality of search results further using the interest model. In addition, the method calculates a personalization score for at least some of the plurality of search results using the interest model. The further computes an adjusted ranking score for the at least some of the plurality of search results using the personalization score of the at least some of the plurality of search results and an original ranking score of the at least some of the plurality of search results. In addition, the computing of the adjusted ranking score for one of the at least some of the plurality of search results occurs if the personalization score is greater or equal to a threshold.

In a further embodiment, the method determines the second ranking for the plurality of search results using the adjusted ranking scores for the at least some of the plurality of search results. The interest model is further generated from a set of user engagements.

In one embodiment, a method re-ranks a plurality of search results is described. In this embodiment, the method receives, by a browser of a device, a search query from a user. The method further sends the search query to a search server. The method additionally receives the plurality of search results from the search server, wherein the plurality of search results is ranked according to a first ranking. In addition, the method retrieves a browser history of the user, wherein the browser history is collected on the device without revealing the browser history to the search server. Furthermore, the method re-ranks the plurality of search results, by the device, according to a second ranking based on at least the browser history. The method additionally presents the plurality of search results using the second ranking.

In another embodiment, the method receives a topic model that includes a cluster of terms appearing is a plurality of seed documents. The topic model is a mapping of a plurality of Uniform Resource Locators to topics. The method further generates an interest model from at least the browser history and the topic model. The method re-ranks the plurality of search results further using the interest model. In addition, the method calculates a personalization score for at least some of the plurality of search results using the interest model. The method further computes an adjusted ranking score for the at least some of the plurality of search results using the personalization score of the at least some of the plurality of search results and an original ranking score of the at least some of the plurality of search results. In addition, the computing the adjusted ranking score for one of the at least some of the plurality of search results occurs if the personalization score is greater or equal to a threshold.

In a further embodiment, the method determines the second ranking for the plurality of search results using the adjusted ranking scores for the at least some of the plurality of search results. The interest model is further generated from a set of user engagements.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
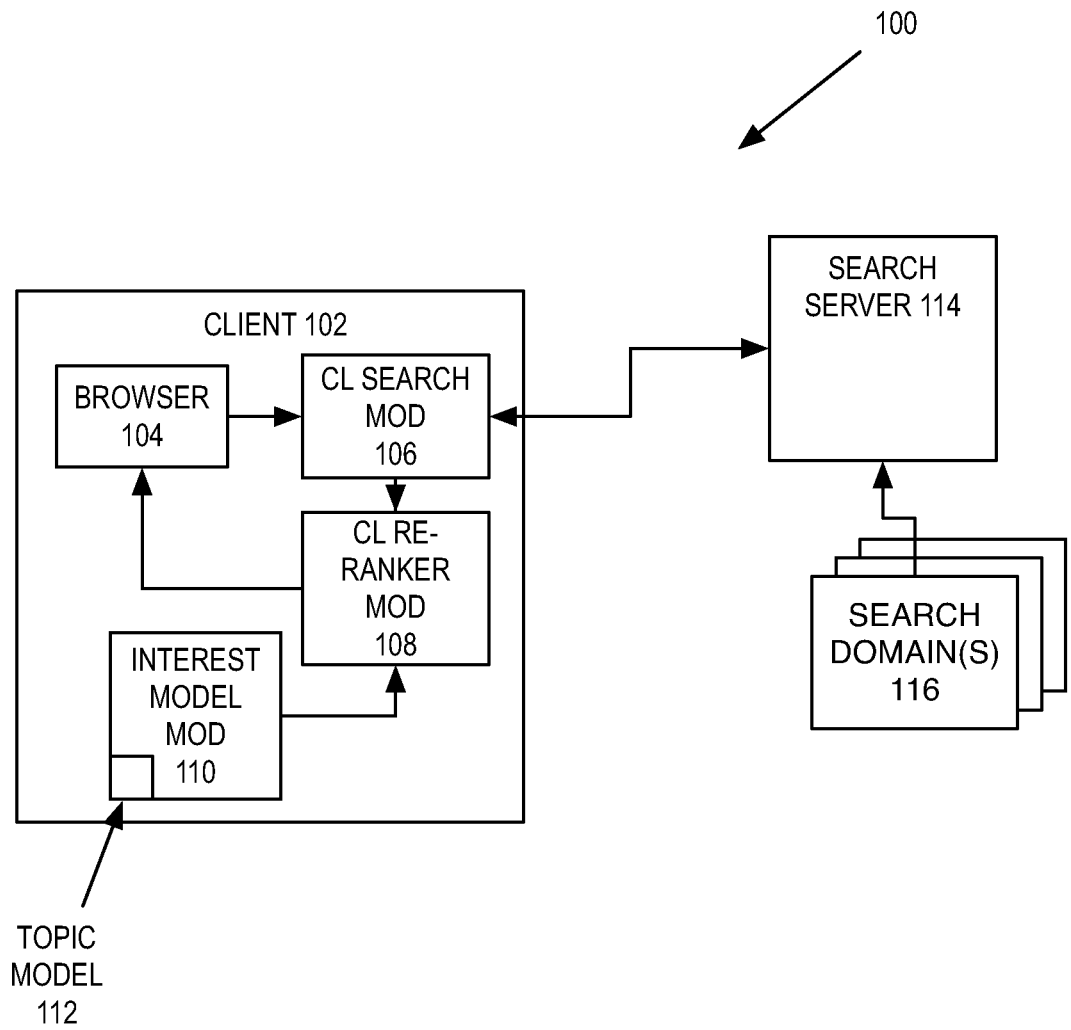
FIG. 1 is a block diagram of one embodiment of a system that returns search result, where the client re-ranks the search results.

A method and apparatus of a device that re-ranks a plurality of search results received from a search server on the device is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that re-ranks a plurality of search results received from a search server on the device is described. In one embodiment, the device re-ranks search results received on the device from a search server using an interest module. The interest model reflects user interest based on the user's browsing history and engagement history. Because the user's browser and engagement history reveals private information about the user's web browsing habits, the device does not send this information to the server. Instead, the device receives a topic model from a topic server, where the topic model is a mapping of Uniform Resource Locators (URLs) to topics. The device uses this topic model, along with the saved browser and engagement histories, to create the interest model. By receiving the topic model from the topic server and creating the interest model on the device that sends the user search requests and receives the search results, the user's browser history and search engagements remain private on this device.

The device further uses the interest model to re-rank the search results, so as to boost the rankings of URLs that have topics, media types, or domain information similar to the user's browser history and/or engagement history. Alternatively, the interest model can also reduce the rankings of URLs that have topics, media types, or domain information that is not similar to the user's browser history and/or engagement history. In one embodiment, the device receives the search results and computes a personalization score for some or all of the URLs in the search results. The device further uses the computed personalization score to re-compute a ranking score for the some or all of the URLs using the personalization score. With the re-computed ranking scores, the device re-ranks the search results.

FIG. 1 is a block diagram of one embodiment of a system 100 that returns search result, where the client re-ranks the search results. In FIG. 1, the system 100 includes a client 102 and search server 114 coupled by a network (not illustrated). In one embodiment, the search server 114 is a collection of one or more servers that receives search requests from client 102 and/or other devices and returns search results back to those devices. In one embodiment, the client 102 and/or search server 114 can be personal computer, laptop, server, mobile device (e.g., smartphone, laptop, personal digital assistant, music playing device, gaming device, etc.), and/or any device capable requesting a search and/or displaying search results. In one embodiment, the client 102 and/or search server 114 can be a physical or virtual device. In one embodiment, the smartphone can be a cellular telephone that is able to perform many function of device 102.

In one embodiment, the client 102 includes a browser 104 that is used to input a query prefix by the user. For example in one embodiment, browser 104 can be a web browser and/or a file browser. Each of these browsers includes a search input field that is used by the user to input the search request. In one embodiment, a web browser is a program that all that allows a user to search and retrieve the web for various type of web documents. In one embodiment, the web browser includes a search input field, where the search input field is used by the user to input a search request string. In this embodiment, the client 102 sends this search request string to the search server 114. In one embodiment, the search server 114 performs the search over one or more search domains 116. In one embodiment, the search server 114 performs a search for relevant results across multiple search domains (e.g., maps, media, wiki, sites, other, or another search domain). The device receives a set of results from the multiple search domains and ranks these results based on scores generated from each search domain and cross-domain information. In addition, the search server 114 determines the search results and sends these search results back to the client.

In one embodiment, the client 102 re-ranks search results based on browser history and/or search engagement. In one embodiment, the client 102 includes a browser 104, client search module 106, client re-ranker 108, and interest model module 110. In this embodiment, when the browser 104 receives a document retrieved via web request (e.g., an hypertext transfer protocol (HTTP) request), the browser 104 stores the corresponding uniform resource locator (URL) in the browser history. As a result, the browser history includes the set of URLs requested by the browser 104, were each of the URLs refers to one or more documents that can be available over a network. Furthermore, in this embodiment, the browser 104 tracks whether search results are engaged, rendered, or abandoned.

In one embodiment, a user viewing search results might engage or abandon the results. In one embodiment, an engagement event occurs if the user interacts with one of the rendered results presented to the user during a user's search session. For example and in one embodiment, the user could click on a link that is presented for one of the rendered results. In another example, the user could click on the link and spend a time greater than a predetermined time interacting with the object (e.g., a website) referenced by that link (e.g., interacts with the referenced object for more than 60 seconds). In this example, the user may receive results directed towards a query search for the current U.S. President and click on a link that references a web page describing the latest presidential speech. If the user interacts with the website for more than a predetermined time (e.g., 60-90 seconds), the device would determine that the user engaged with the result represented by that link. In another embodiment, the user may ignore or abandon results rendered for the user. For example and in one embodiment, if a user clicks on a link presented for one of the rendered results, but navigates away from that website within a predetermined time (e.g., less than 60-90 seconds), the device determines that this is an abandonment event for that result.

In one embodiment, this feedback can be incorporated into the search engagement, where the feedback influences the re-ranking of search results. In this embodiment, the client that presents and renders the relevant results additionally collects the engagement and abandonment events for a user's search session. The client collects the events into a feedback package and stores this package in the search engagement. In one embodiment, the feedback package includes the information <query, result, render counts, engagement counts, abandonment counts>, where query is the input query and context information such as, device type, application, locale, and geographic location, result is the render result, render counts is the number of times the result is rendered for that query, engagement counts is the number of times the result is engaged for that query, and abandonment counts is the number of times that result is abandoned.

In one embodiment, by using the browser history and search engagements, the client 102 can build an interest model that models the interests of the users browsing history. In this embodiment, this interest model remains on client 102 so that the user's browsing interests remain private and located on the client 102. Furthermore, the interest model is not sent to another device (e.g., a search server or some other remote device). In one embodiment, the interest model module 110 builds an interest model using the browser history and search engagement by creating a set of feature vectors from the documents referenced in the browser history and search engagements. Building the interest model is further described in FIG. 4 below. In one embodiment, the interest model module 110 receives the topic model 112 from a topic model server as described in FIG. 2 below.

As described above, the client 102 can re-rank search results received from the search server 114. In one embodiment the browser 104 receives a search request and sends it to the client search module 106. The client search module 106 sends the search request to the search server 114, where the search server 114 performs a search over one or more search domains 116. The search server 114 determines and scores each of the search results, where the individual search results score is used to rank the search results. In one embodiment, the search server 114 sends back the search results, which includes the search results scores. The client search module 106 receives the search results and forwards these search results to the client re-ranker module 108. In this embodiment, the client re-ranker module 108 can re-rank the search results by computing a personalization score for some or all of the search results. In one embodiment, the client re-ranker module 108 re-ranks using a personalization score module 118 and the interest model that is generated by the interest model module 110. The search result re-ranking is further described FIGS. 5 and 6 below.

Figure 2:
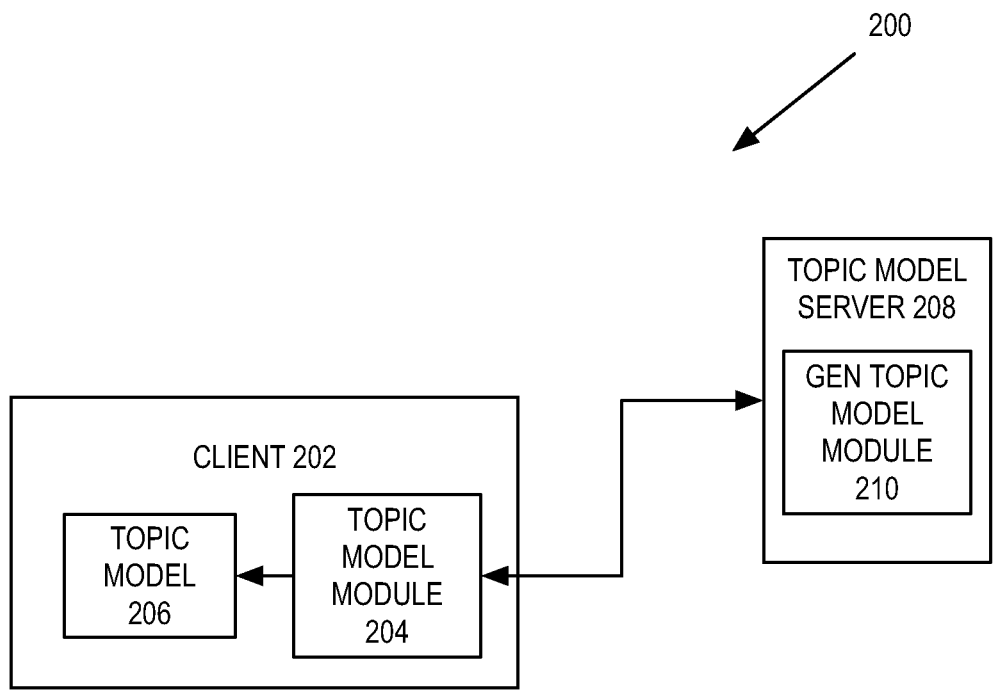
FIG. 2 is a block diagram of one embodiment of a system that generates and sends a topic model to a client.

FIG. 2 is a block diagram of one embodiment of a system 200 that generates and sends a topic model to a client. In FIG. 2, the system 200 includes a client 202 coupled to a topic model server 208. In one embodiment, the client 202 and/or search server 208 can be personal computer, laptop, server, mobile device (e.g., smartphone, laptop, personal digital assistant, music playing device, gaming device, etc.), and/or any device capable requesting a search and/or displaying search results. In one embodiment, the client 102 and/or search server 114 can be a physical or virtual device. In one embodiment, the client 202 includes a topic model module 204. In this embodiment, the topic server 208 periodically sends the topic model 206. The client stores this topic model 206. In one embodiment, the topic model 206 is a mapping of URLs to topics. In one embodiment, the URLs can be partial or complete URLs. For example in one embodiment, the URL "www.CNN.com/" could map to the topic "news." Furthermore, the URL "www.CNN.com/sports" could be mapped to the topic "sports." In one embodiment, the client 102 uses the topic model to create the interest model as described in FIG. 1 above.

In one embodiment, the topic model server 208 creates the topic model 206 by analyzing the top N domains and mapping these domains to one or more topics. In one embodiment, the top N domains can be the most popular domains, domains receiving the most views over some time period, and/or domains chosen suing some other metric. In one embodiment, a generate topic model module 210 maps the domains to topics. The mapping of domains to topics to generate a topic model is further described in FIG. 3 below.

Figure 3:
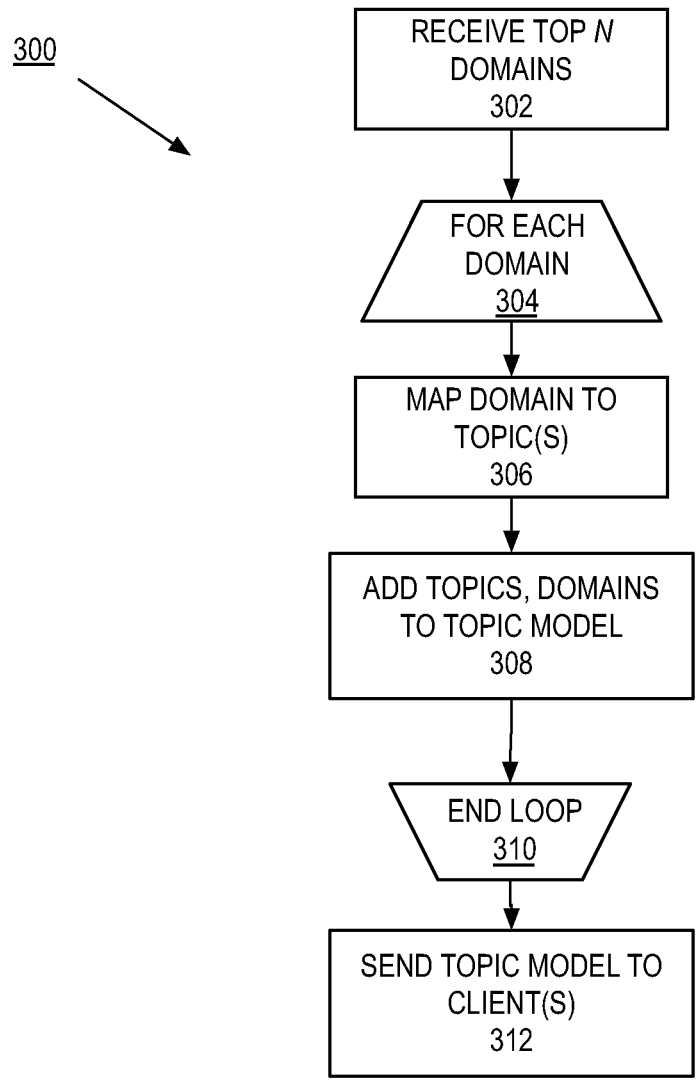
FIG. 3 is a flowchart of one embodiment of a process to generate a topic model.

FIG. 3 is flowchart of one embodiment of a process 300 to generate a topic model. In one embodiment, process 300 is performed by a generate topic model module, such as the generate topic model module 210 as described in FIG. 2 above. In FIG. 3, process 300 begins by receiving the top N domains at block 302. In one embodiment, a domain is a URL prefix that encompasses one or more full or partial URLs. In this embodiment, the domain can be: a hostname; hostname plus a path; a hostname, path, and filename; hostname, path, query; posting, path, fragment; and/or a combination thereof. For example in one embodiment the URL prefixes can encompass multiple domains or subdomains, such as "CNN.com," "CNN.com/news," "CNN.com/entertainment," or "sports.yahoo.com."

In addition, process 300 performs a processing loop (blocks 304-310) to map each of the domains to a set of topics. At block 306, process 300 maps the domain to one or more topics. In one embodiment, a domain may encompass multiple URL prefixes and thus map to multiple topics. For example and in one embodiment, the domain "CNN.com" may map to: news; news and movies; or news, sports, movies, and other topics. As another example and in another embodiment, the domain "CNN.com" may map to the topic news and the domains "CNN.com/news" and "CNN.com/entertainment" may map to the topics news and entertainment, respectively. As another example, the domain "sports.yahoo.com" may map to the topic sports. Process 300 adds the topics and domains mapping to the topic model at block 308. The processing loop ends at block 310. At block 312, process 300 sends the topic model to one or more clients that use the topic model to build the interest model on the client. In one embodiment, process 300 can periodically build the topic model based on time interval (e.g., daily, weekly, or some other fixed time interval), external event (e.g., the number and type of domains changes rapidly or less rapidly based on one or more external events), and/or some other schedule.

Figure 4:
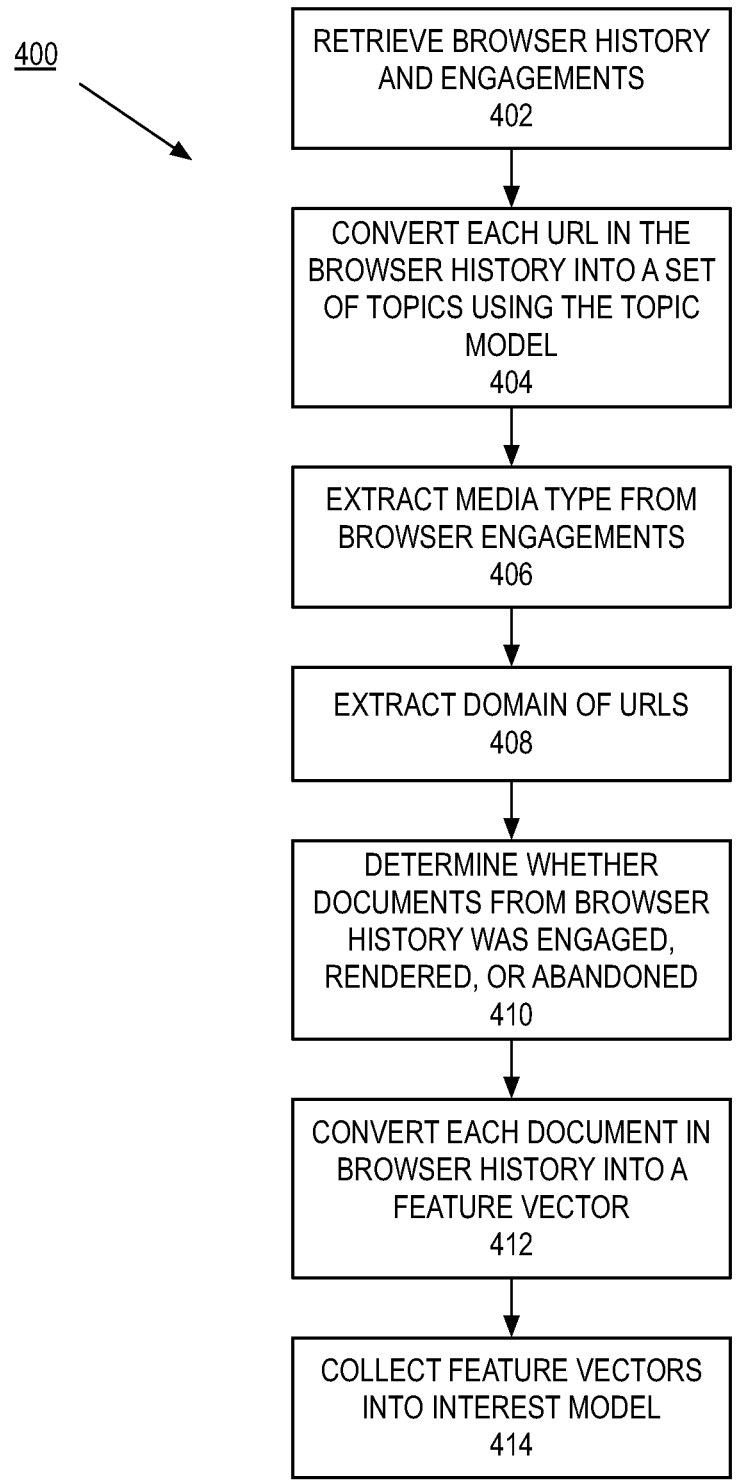
FIG. 4 is a flowchart of one embodiment of a process to generate an interest model using the topic model.

FIG. 4 is flowchart of one embodiment of a process 400 to generate an interest model using the topic model. In one embodiment, process 400 is performed by an interest model module to generate an interest model, such as interest model module 110 as described in FIG. 1 above. In FIG. 1, process 400 begins by retrieving the browser history and search engagements at block 402. In one embodiment, the browser history is the set of web documents that the user has previous requested and the search engagements is a set of indications that a user has engaged, rendered, or abandoned the URL associated with that engagement. While in one embodiment, process 400 creates the interest model from the browser history and search engagements, in alternate embodiments, any type of user action on the client can be used to generate the interest model. At block 404, process 400 converts each URL in the browser history into a set of topics using the topic model. In this embodiment, process 400 uses the topic model, which is a map of URLs to topics, to generate a set of topics from the browser history URLs. For example and in one embodiment, the URL "CNN.com" may map to the topic news and the URLs "CNN.com/news" and "CNN.com/entertainment" may map to the topics news and entertainment, respectively. In one embodiment, the set of topics generated from the browser history reflects the type of topics the user frequents by the browser. Process 400 extracts the media type from the search engagements at block 406. In one embodiment, the extracted media types are used to compute the feature vector for the browser history URL corresponding to the search engagement. The media type is used to determine which type of accessed document a user prefers. In one embodiment, the media types for the browser history would be web pages. For the search engagements, the media type can indicate what types of documents the user engaged (or abandoned) (e.g., web pages, images, videos, music, and/or any other type of media). At block 408, process 400 extracts the domains from the URLs. In one embodiment, process 400 extracts the domain information from the browser history and search engagements. In one embodiment, the domain is the top-level domain information from each of the browser history and engagements.

At block 410, process 400 determines whether the documents from the browser history were engaged, rendered, or abandon. In one embodiment, if a URL of a browser history was engaged or rendered, this would indicate that this URL was a URL favored by the user. Alternatively, if a URL of a browser history was abandoned, this would indicate is disfavored by the user. In one embodiment, if the URL was in the browser history then process 400 sets the values of render=1, engaged=1. If the URL was a search result and was rendered only, then the render count is 1. If the URL in search result is engaged, then the engaged is set to 1.

At block 412, process 400 converts each document in the browser history and the search engagements into a feature vector. In one embodiment, process 400 creates a topic score for each of the URLs from the browser history and search engagements. In this embodiment, by using the scoring scheme above, process 400 creates a feature vector as follows:

Feature vector (browser history URL or search result Interaction)=[(topic1, score1), (topic2, score2) . . . (topicN, scoreN), (media_type_1, 1), . . . (media_type_k, 1), (domain, 1)]

where topic1-topicN or the different topics for that feature vector, score1-scoreN are the scores for the corresponding topics, media_type_1-media_type_N are the media types for the feature vector, and domain is the domain associated with his future vector.

At block 414, process 400 collects the feature vectors into the interest model. In one embodiment, process 400 converts the feature vectors into a centroid vector. In this embodiment, process 400 aggregates the feature vectors together and then applies a scaling factor and/or normalization factor to the centroid vector. For example and in one embodiment, process 400 aggregates the feature vectors into a new feature vector, where each feature vector is scored using a formula that has different values depending if the feature vector component is a topic, media type, or domain. In this example, the score for the feature for a topic, that is summed over all the URLs, is:

$$\text{score(feature)}=(\text{topic-score(url)}*\text{number\_engaged\_with\_browser})+w1*(\text{topic-score(url)}*\text{num\_engaged\_searchResults})+w2*(\text{topic-score(url)}*\text{num\_engaged\_searchResults})/(\text{topic-score(url)}*\text{num\_rendered\_searchResults}) \quad (1)$$

The score for media type is:

$$\text{score(feature)}=\text{num\_engaged\_browser(with the media type)}+w5*\text{num\_engaged\_searchResults (with the domain)}+w6*\text{num\_engaged\_searchResults(with the domain)}/\text{num\_rendered\_searchResults(with the media type)} \quad (2)$$

The score for the domain is:

$$\text{num\_engaged\_safari(with the domain)} + \\ w3*\text{num\_engaged\_searchResults(with the domain)} + w4*\text{num\_engaged\_searchResults(with the domain)/num\_rendered\_searchResults(with the domain)} \quad (3)$$

In this embodiment, the topic-score are the individual topic score that process 400 extracts using the url_topics. In addition, w1, w2, w3, w4, w5, w6=weights for the different scoring components. Furthermore, process 400 removes the features where the total times process 400 has seen that feature is less than an absolute number threshold (min_tf). This helps in removing the features for which process 400 does not have statistically significant data. Moreover, process 400 normalizes the vector using the verbal norm. In one embodiment, "norm" can take values, such as, L1-Norm, L2-Norm, or no-normalization. Process 400 can additionally apply in inverse document frequency scaling. In one embodiment, the inverse document scaling may not be applied during the centroid calculation, but may be applied during a similarity function (e.g., co-sine similarity, or some other similarity function). In one embodiment, process 400 optimizes the interest model calculation to run efficiently on embedded devices, at an opportune moment (e.g., once a day, when the user not using your device and device plugged in, and/or other criteria).

Figure 5:
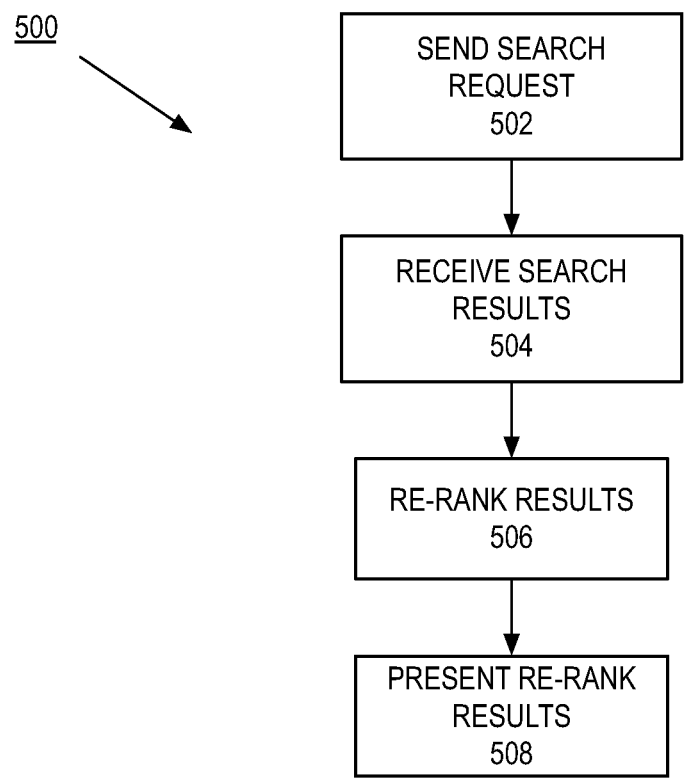
FIG. 5 is a flowchart of one embodiment of a process to re-rank search results.

As described above, with the interest model, the client can re-rank search results using this interest model. FIG. 5 is flowchart of one embodiment of a process 500 to re-rank search results. In one embodiment, process 500 is performed by a client re-ranking module to re-rank search results received by a client, such as the client re-ranker module 108 is described in FIG. 1 above. In FIG. 5, process 500 begins by sending a search request to the search server a block 502. In one embodiment, the search request can include the search request string and possibly other information (e.g., device type, and/or another type of information). In one embodiment, the search request includes a user's top K topics and topic scores. Which topics process 500 includes in the threshold is based on a search request topic threshold. In this embodiment, this threshold is a minimum value of topic score for this topic to be sent as part of the search request. If the threshold is 0, all of the user's topics are sent as part of the search requests. If the threshold >0 (e.g., 0.3), the user's topics that have a score greater than or equal to the threshold is sent as part of the search request. In one embodiment, the topic scores are part of the interest model generated for the user as described above in FIG. 4. At block 504, process 500 receives the search results from the search server. In one embodiment, the search results include a set of URLs and a ranking score for each of these URLs. In one embodiment, process 500 further applies the topic model to each of the documents returned from the server as part of the search results. In this embodiment, applying the topic model to each of the search result documents enables a client-side similarity calculation between the user interest model topics and the search results and to compute the "result_score_for_feature" value used below. For example and in one embodiment, the topic model is run for each document in the search indexed by the search domains on the search server as illustrated in FIG. 1. The topics and topic scores for each of the documents are annotated as part of the metadata returned in search results from the server to the client when the user is executing a search. Process 500 re-ranks the search results at block 506. In one embodiment, process 500 determines whether to re-rank the search results at all. In this embodiment, process 500 uses a threshold to determine whether to re-rank using the personalization. For example and in one embodiment, the re-rank threshold can be set by experimenting with an A/B experiment of comparing using personalization to re-rank versus not re-ranking. Process 500 can initially by choosing scores for a re-ranking threshold that are conservative, such as, twice the standard-deviation in the divergence in the user versus global interest vector. For example and in one embodiment, process 500 can start with thresholds that restrict the number of times process 500 re-ranks the search results to around 5-10% of the queries, and later increase this threshold as the effect of re-ranking is better understood. If there is no re-ranking, process 500 presents the search results as is.

If the search results are to be re-ranked, and in one embodiment, process 500 can re-rank some or all of the search results. For example and in one embodiment, process 500 re-ranks a section of the search results and re-ranks the search results within this section. In one embodiment, process 500 re-ranks some or all the search results by computing a personalization score for each of these search results to be re-ranked and re-computing the ranking score for a URL using the personalization score for that URL. Re-ranking using a personalization score is further described in FIG. 6 below. At block 508, process 500 presents the re-ranked results. In one embodiment, process 500 forwards the re-ranked results to the browser, where the browser presents these re-ranked results to the user.

Figure 6:
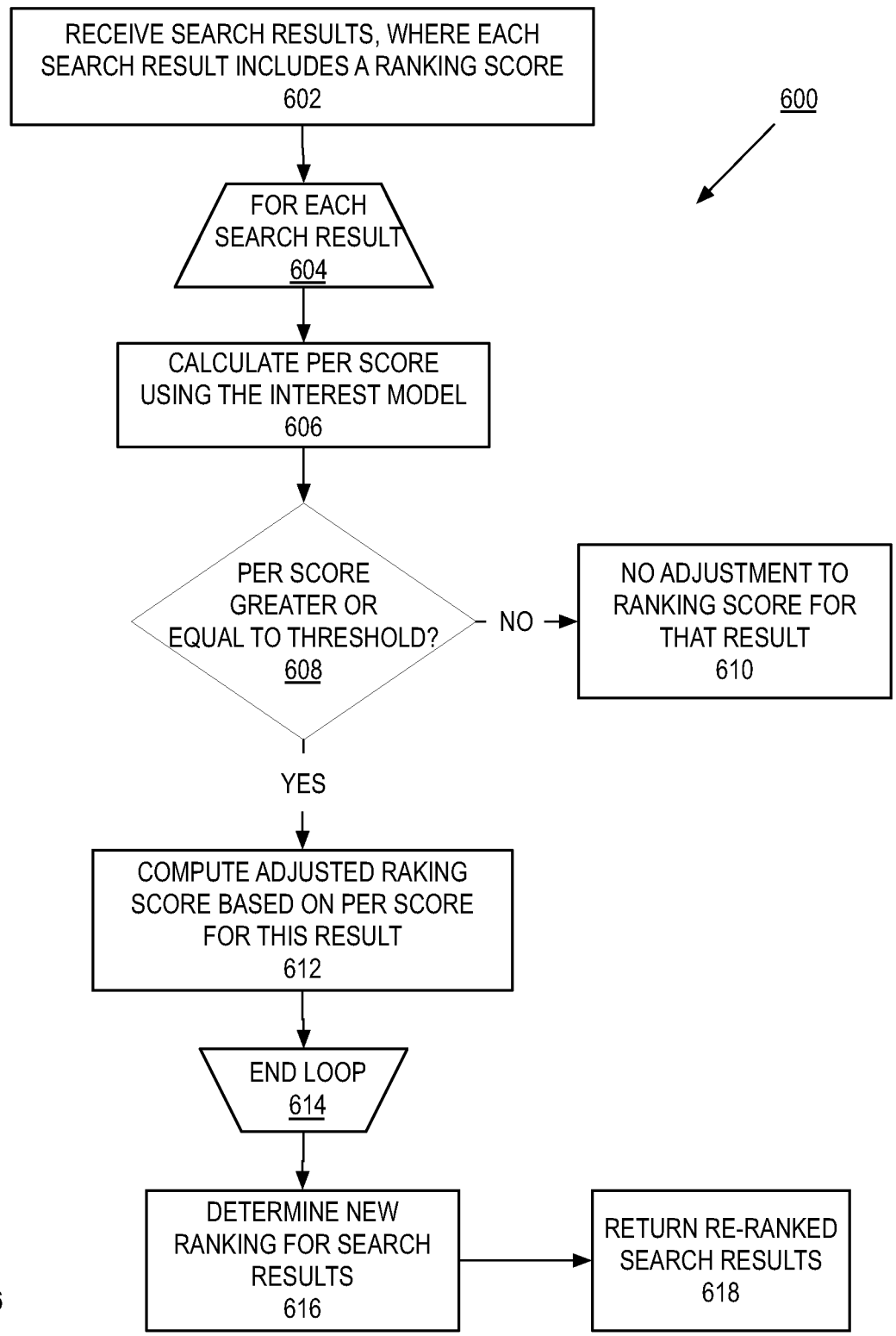
FIG. 6 is a flow chart of one embodiment of a process to re-score search results using the interest model.

As per above, process 500 computes a personalization score for the URLs and uses this personalization score to re-rank the search results. FIG. 6 is a flow chart of one embodiment of a process 600 to re-score search results using the interest model. In one embodiment, process 600 is performed by a personalization score module to compute the personalization scores and use these personalization scores to re-rank the search results, such as the personalization score module 118 as described in FIG. 1 above. In FIG. 6 process 600 begins by receiving the search results where each of the search results includes a ranking score at block 602. In one embodiment, the ranking scores for each of the search results are received from a search server, which generates the ranking score for each search result based on in part the ranking score from the search domains. Process 600 performs a processing loop (block 604-614) to re-compute the ranking score based on a personalization score for that search result. At block 606, process 600 computes personalization score for that search result. In one embodiment, process 600 calculates the personalization score for a search result by finding the dot product/cosine similarity of the result with respect to the centroid vector and by applying a feature scaling. For example in one embodiment, the personalization score is as follows:

$$\text{personalization-score(using dot product)} = \text{centroid\_score\_for\_feature}* \\ \text{result\_score\_for\_feature}*\text{scaling\_for\_feature} \quad (4)$$

At block 608, process 600 determines if the personalization score for that search result is greater than or equal to a threshold. If the personalization score is not greater or equal to the threshold, process 600 applies no adjustment to the ranking score for that result at block 610. If the personalization score is greater than or equal to the threshold, process 600 computes the adjusted ranking score based on the personalization score for the search result at block 612. In one embodiment, process 600 computes the adjusted ranking score using the following formula:

$$\text{adjusted-raking-score} = \text{ranking-score}*(1-\text{personalization\_weight}) + \text{personalization-score}* \text{personalization\_weight} \quad (5)$$

where the personalization_weight is a weight that is used to balance the contributions from the original ranking score and the personalization score. The personalization_weight can range from 0 (no personalization at all) to 1 (complete personalization). In one embodiment, the ranking score is supplied by the search results and can be calculated using a linear rank decay (1/i) or a quadratic rank decay (1/(i*i)), where i is the position of the results. If the quadratic rank decay is used, the ranking score is computed as ranking-score(d)=(N−rank(d))/N where N is the number of URLs in the result set from the server number. In addition, the personalized-score(d)=(N−personalized_rank(d))/N where personalized_rank is the rank of document d where the ranking is ordered by cosine similarity score between the document topic vector and the user interest vector. In one embodiment, the weights of the client models can be experimented directly from the server and fine-tuned based on positive and/or negative user responses. The processing loop ends at block 614.

At block 616, process 600 determines the new ranking for the search results using the adjusted ranking scores for some or all of the search results. In one embodiment, process 600 determines the new ranking for the search results using the following conditions: (i) the new rankings or within a specific section; (ii) process 600 throws out a result for the rank that's greater than the section maximum result; and/or (iii) the search results are re-ranked within a range (e.g., [section_start_pos, section_end_pos]). In another embodiment, process 600 can further apply certain rules on top of these new results. For example and in one embodiment, a top result with a large icon cannot be down ranked by result with a small icon/no icon result. These rules can be controlled/enabled using the re-ranking_rules within the modeling algorithm protocol. In this example, there can be a rule that forces the result with larger icons to remain on the top; that there is a maximum rank movement for a result; higher-quality icons are on the top for the results; that certain domain results are always on the top. For example in one embodiment, if the game is going on and process 600 wants for sports results to be on the top and does not want to have for example, music results to creep up. Furthermore, process 600 may also de-duplicate search results since a search result may possibly be both in the top and bottom sections. By de-duplicating, process 600 allows only one copy of this search result to be presented. At block 616, process 600 returns the re-ranked search results.

Figure 7:
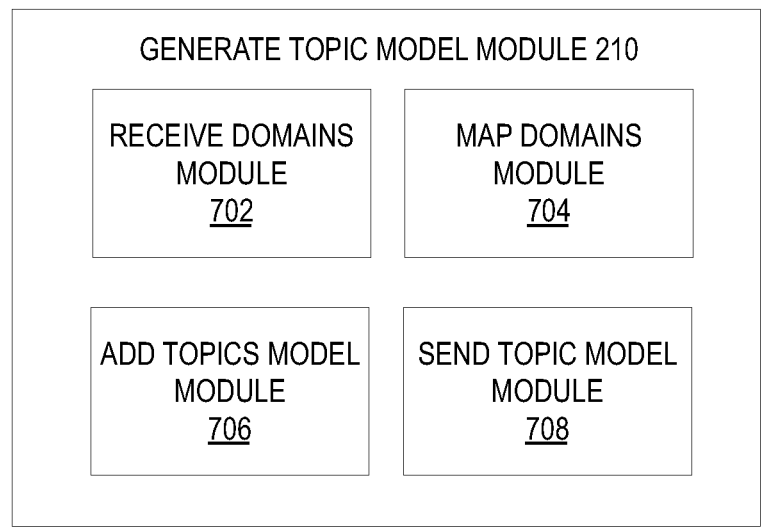
FIG. 7 is a block diagram of one embodiment of a generate topic model module that generates a topic model.

FIG. 7 is a block diagram of one embodiment of a generate topic model module 210 that generates a topic model. In one embodiment, the generate topic model module 210 includes a receive domains module 702, map domains module 704, add topics model module 706, and send topic model module 708. In one embodiment, the receive domains module 702 receives the top N domains as described in FIG. 3, block 302 above. The map domains module 704 maps the domains to topics as described in FIG. 3, block 306 above. The add topics model module 706 adds the topics and domains to the topic model as described in FIG. 3, block 308 above. The send topic model module 708 sends the topic model to the clients as described in FIG. 3, block 312 above.

Figure 8:
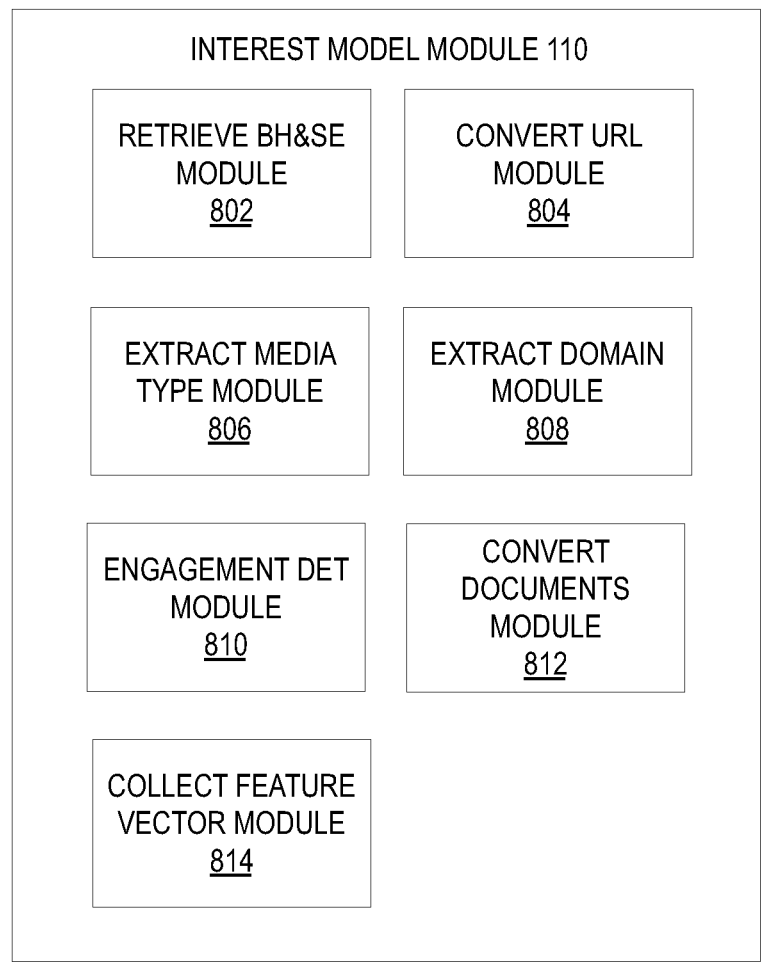
FIG. 8 is a block diagram of one embodiment of an interest model module that generates an interest model using the topic model.

FIG. 8 is a block diagram of one embodiment of an interest model module 110 that generates an interest model using the topic model. In one embodiment, the interest model module 110 includes a retrieve browser history and search engagements module 802, convert URL module 804, extract media type module 806, extract domain module 808, engagement determination module 810, convert document module 812, and collect feature vector module 814. In one embodiment, the retrieve browser history and search engagements module 802 retrieves the browser history and engagements as described in FIG. 4, block 402 above. The convert URL module 804 converts each URL in the browser history into a set of topics using the topic model as described in FIG. 4, block 404 above. The extract media type module 806 extracts the media types from the search engagements as described in FIG. 4, block 406 above. The extract domain module 808 extracts the domains from the URLs as described in FIG. 4, block 408 above. The engagement determination module 810 determines whether documents from the browser history was engaged, rendered, or abandoned as described in FIG. 4, block 410 above. The convert document module 812 converts each document in the browser history and search engagement into a feature vector as described in FIG. 4, block 412 above. The collect feature vector module 814 collects the feature vectors into the interest model as described in FIG. 4, block 414 above.

Figure 9:
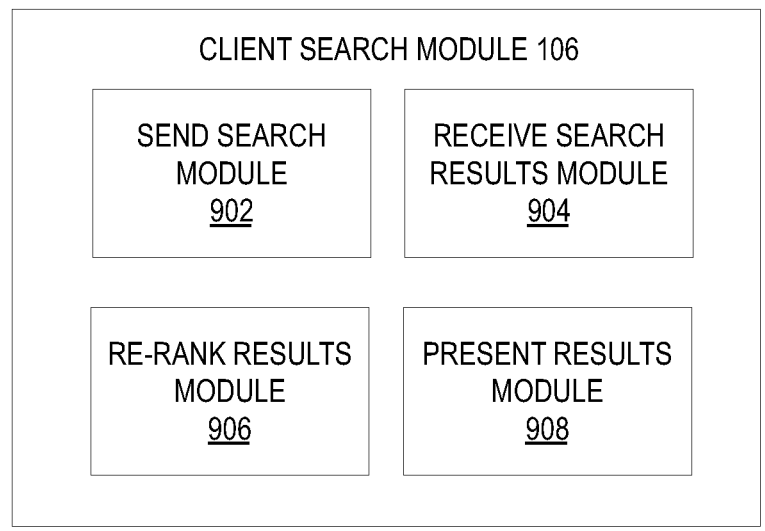
FIG. 9 is a block diagram of one embodiment of a client search module that re-ranks search results.

FIG. 9 is a block diagram of one embodiment of a client search module 106 that re-ranks search results. In one embodiment, the client search module 106 includes send search request module 902, receive search results module 904, re-rank results module 906, and present results module 908. In one embodiment, the send search request module 902 sends the search request to the search server as described in FIG. 5, block 502 above. The receive search results module 904 receives the search results from the search server as described in FIG. 5, block 504 above. The re-rank results module 906 re-ranks the received search results as described in FIG. 5, block 506 above. The present results module 908 presents the re-ranked results as described in FIG. 5, block 508 above.

Figure 10:
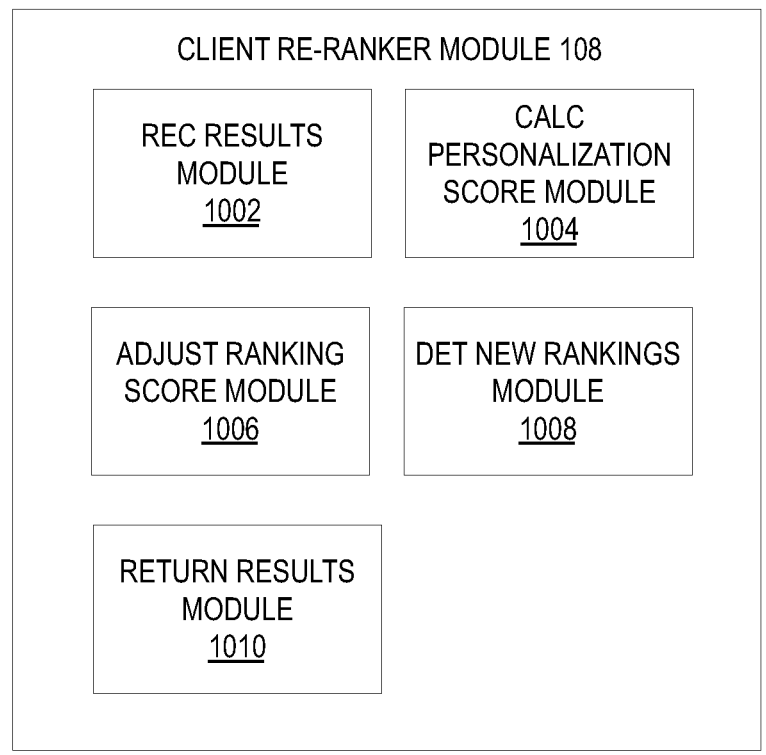
FIG. 10 is a block diagram of one embodiment of a client re-ranker module that re-scores search results using the interest model.

FIG. 10 is a block diagram of one embodiment of a client re-ranker module 108 that re-scores search results using the interest model. In one embodiment, the client re-ranker module 108 includes a receive results module 1002, calculate personalization score module 1004, adjust ranking score module 1006, determine new rankings module 1008, and return results module 1010. In one embodiment, the receive results module 1002 receives the search results as described in FIG. 6, block 602 above. The calculate personalization score module 1004 calculates a personalization score for a search result using the interest model as described in FIG. 6, block 606 above. The adjust ranking score module 1006 computes the adjusted ranking score for result using the personalization score as described in FIG. 6, block 612 above. The determined new rankings module 1008 determines the new rankings for the search results as described in FIG. 6, block 616 above. The return results module 1010 returns the re-ranked search results as described in FIG. 6, block 618.

The present disclosure recognizes that the use of such personal information data, in the present technology, can be used to the benefit of users. For example, the personal information data can be used to re-rank search results that is of greater interest to the user. Accordingly, use of such personal information data enables calculated control of the search results. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Figure 11:
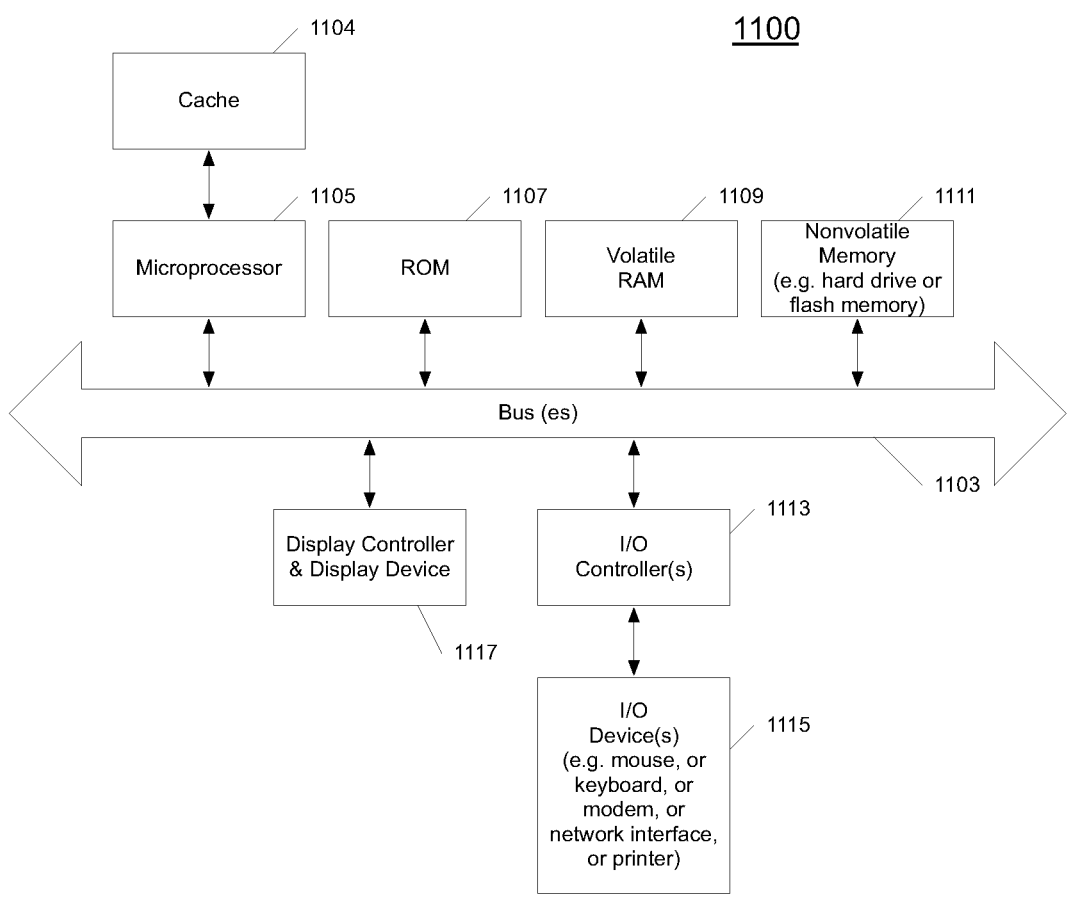
FIG. 11 illustrates one example of a typical computer system, which may be used in conjunction with the embodiments described herein.

FIG. 11 shows one example of a data processing system 1100, which may be used with one embodiment of the present invention. For example, the system 1100 may be implemented including a client 102 as shown in FIG. 1. Note that while FIG. 11 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 11, the computer system 1100, which is a form of a data processing system, includes a bus 1103 which is coupled to a microprocessor(s) 1105 and a ROM (Read Only Memory) 1107 and volatile RAM 1109 and a non-volatile memory 1111. The microprocessor 1105 may include one or more CPU(s), GPU(s), a specialized processor, and/or a combination thereof. The microprocessor 1105 may retrieve the instructions from the memories 1107, 1109, 1111 and execute the instructions to perform operations described above. The bus 1103 interconnects these various components together and also interconnects these components 1105, 1107, 1109, and 1111 to a display controller and display device 1117 and to peripheral devices such as input/output (I/O) devices which may be mice, keyboards, modems, network interfaces, printers and other devices which are well known in the art. Typically, the input/output devices 1115 are coupled to the system through input/output controllers 1113. The volatile RAM (Random Access Memory) 1109 is typically implemented as dynamic RAM (DRAM), which requires power continually in order to refresh or maintain the data in the memory.

The mass storage 1111 is typically a magnetic hard drive or a magnetic optical drive or an optical drive or a DVD RAM or a flash memory or other types of memory systems, which maintain data (e.g. large amounts of data) even after power is removed from the system. Typically, the mass storage 1111 will also be a random access memory although this is not required. While FIG. 11 shows that the mass storage 1111 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1103 may include one or more buses connected to each other through various bridges, controllers and/or adapters as is well known in the art.

Figure 12:
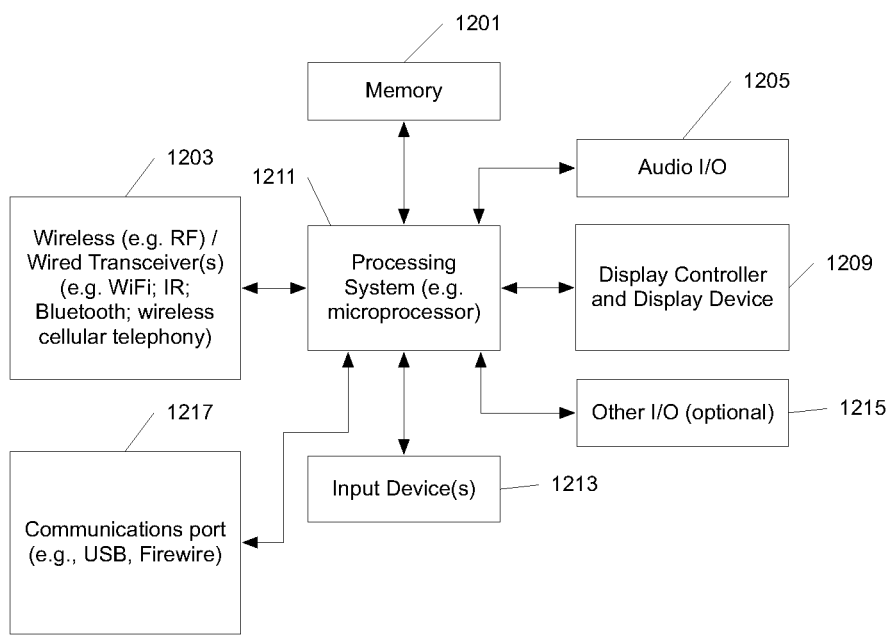
FIG. 12 shows an example of a data processing system, which may be used with one embodiment of the present invention.

FIG. 12 shows an example of another data processing system 1200 which may be used with one embodiment of the present invention. For example, system 1200 may be implemented as a client 102 as shown in FIG. 1. The data processing system 1200 shown in FIG. 12 includes a processing system 1211, which may be one or more microprocessors, or which may be a system on a chip integrated circuit, and the system also includes memory 1201 for storing data and programs for execution by the processing system. The system 1200 also includes an audio input/output subsystem 1205, which may include a microphone and a speaker for, for example, playing back music or providing telephone functionality through the speaker and microphone.

A display controller and display device 1209 provide a visual user interface for the user; this digital interface may include a graphical user interface which is similar to that shown on a Macintosh computer when running OS X operating system software, or Apple iPhone when running the iOS operating system, etc. The system 1200 also includes one or more wireless transceivers 1203 to communicate with another data processing system, such as the system 1200 of FIG. 12. A wireless transceiver may be a WLAN transceiver, an infrared transceiver, a Bluetooth transceiver, and/or a wireless cellular telephony transceiver. It will be appreciated that additional components, not shown, may also be part of the system 1200 in certain embodiments, and in certain embodiments fewer components than shown in FIG. 12 may also be used in a data processing system. The system 1200 further includes one or more communications ports 1217 to communicate with another data processing system, such as the system 1500 of FIG. 15. The communications port may be a USB port, Firewire port, Bluetooth interface, etc.

The data processing system 1200 also includes one or more input devices 1213, which are provided to allow a user to provide input to the system. These input devices may be a keypad or a keyboard or a touch panel or a multi touch panel. The data processing system 1200 also includes an optional input/output device 1215 which may be a connector for a dock. It will be appreciated that one or more buses, not shown, may be used to interconnect the various components as is well known in the art. The data processing system shown in FIG. 12 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device or an embedded device or other consumer electronic devices. In other embodiments, the data processing system 1200 may be a network computer or an embedded processing device within another device, or other types of data processing systems, which have fewer components or perhaps more components than that shown in FIG. 12.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. Pat. No. 7,345,671 and U.S. published patent number 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "ranking," "receiving," "determining," "computing," "sending," "retrieving," "presenting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A machine-readable medium having executable instructions to cause one or more processing units to perform a method to re-rank a plurality of search results, the method comprising:
receiving, by a browser of a device, a search query from a user;
sending the search query to a search server;
receiving, on the device, the plurality of search results from the search server, wherein the plurality of search results is ranked according to a first ranking;
retrieving a browser history of the user, wherein the browser history is collected on the device without revealing the browser history to a remote server;
generating, by the device, an interest model from at least the browser history, a topic model, and a set of user engagements, wherein the set of user engagements represent user interactions with previous search results by the user and the set of user engagements and the interest model remain private on the device, wherein the generating of the interest model further comprises,
collecting a plurality of feature vectors in the interest model, wherein the plurality of feature vectors includes a set of topics for each of the web documents in the browser history and the set of user engagements, and
aggregating the plurality of feature vectors;
re-ranking, by the device, the plurality of search results using at least the interest model according to a second ranking, wherein the re-ranking includes computing a personalizing score for each of the search results based on at least the aggregated plurality of feature vectors; and
presenting the plurality of search results using the second ranking.

2. The machine-readable medium of claim 1, further comprising:
receiving the topic model that includes a cluster of terms appearing is a plurality of seed documents.

3. The machine-readable medium of claim 2, wherein the topic model is a mapping of a plurality of Uniform Resource Locators to topics.

4. The machine-readable medium of claim 1, wherein the re-ranking comprises:
calculating a personalization score for at least some of the plurality of search results using the interest model.

5. The machine-readable medium of claim 4, wherein the re-ranking further comprises:
computing an adjusted ranking score for the at least some of the plurality of search results using the personalization score of the at least some of the plurality of search results and an original ranking score of the at least some of the plurality of search results.

6. The machine-readable medium of claim 5, wherein the computing the adjusted ranking score for one of the at least some of the plurality of search results occurs if the personalization score is greater or equal to a threshold.

7. The machine-readable medium of claim 4, wherein the re-ranking further comprises:
determining the second ranking for the plurality of search results using the adjusted ranking scores for the at least some of the plurality of search results.

8. The machine-readable medium of claim 1, wherein each of the set to user engagements is based on at least an amount of time a user interacts with a web document associated with that user engagement and is at least one of an engagement, render, and abandonment.

9. The machine-readable medium of claim 1, wherein the generating of the interest model further comprises:
extracting a media type from each of the set of user engagements and the media types are added to the plurality of feature vectors.

10. The machine-readable medium of claim 1, wherein the generating of the interest model further comprises:
extracting a plurality of domains from the browser history, wherein the plurality of domains are added to the plurality of feature vectors.

11. A method to re-rank a plurality of search results, the method comprising:
receiving, by a browser of a device, a search query from a user;
sending the search query to a search server;
receiving, on the device, the plurality of search results from the search server, wherein the plurality of search results is ranked according to a first ranking;
retrieving a browser history of the user, wherein the browser history is collected on the device without revealing the browser history to a remote server;
generating an interest model from at least the browser history a topic model, and a set of user engagements, wherein the set of user engagements represent a user interaction with previous search results and the set of user engagements and the interest model remain private on the device, wherein the generating of the interest model further comprises,
collecting a plurality of feature vectors in the interest model, wherein the plurality of feature vectors includes a set of topics for each of the web documents in the browser history and the set of user engagements; and
aggregating the plurality of feature vectors;
re-ranking, by the device, the plurality of search results using at least the interest model according to a second ranking; and
presenting the plurality of search results using the second ranking, wherein the re-ranking includes computing a personalizing score for each of the search results based on at least the aggregated plurality of feature vectors.

12. The method of claim 11, further comprising:
receiving the topic model that includes a cluster of terms appearing is a plurality of seed documents.

13. The method of claim 12, wherein the topic model is a mapping of a plurality of Uniform Resource Locators to topics.

14. The method of claim 11, wherein the re-ranking comprises:
calculating a personalization score for at least some of the plurality of search results using the interest model.

15. The method of claim 14, wherein the re-ranking further comprises:
computing an adjusted ranking score for the at least some of the plurality of search results using the personalization score of the at least some of the plurality of search results and an original ranking score of the at least some of the plurality of search results.

16. The method of claim 15, wherein the computing the adjusted ranking score for one of the at least some of the plurality of search results occurs if the personalization score is greater or equal to a threshold.

17. The method of claim 14, wherein the re-ranking further comprises:
  determining the second ranking for the plurality of search results using the adjusted ranking scores for the at least some of the plurality of search results.

\* \* \* \* \*